United States Patent Office 2,908,017
Patented Oct. 13, 1959

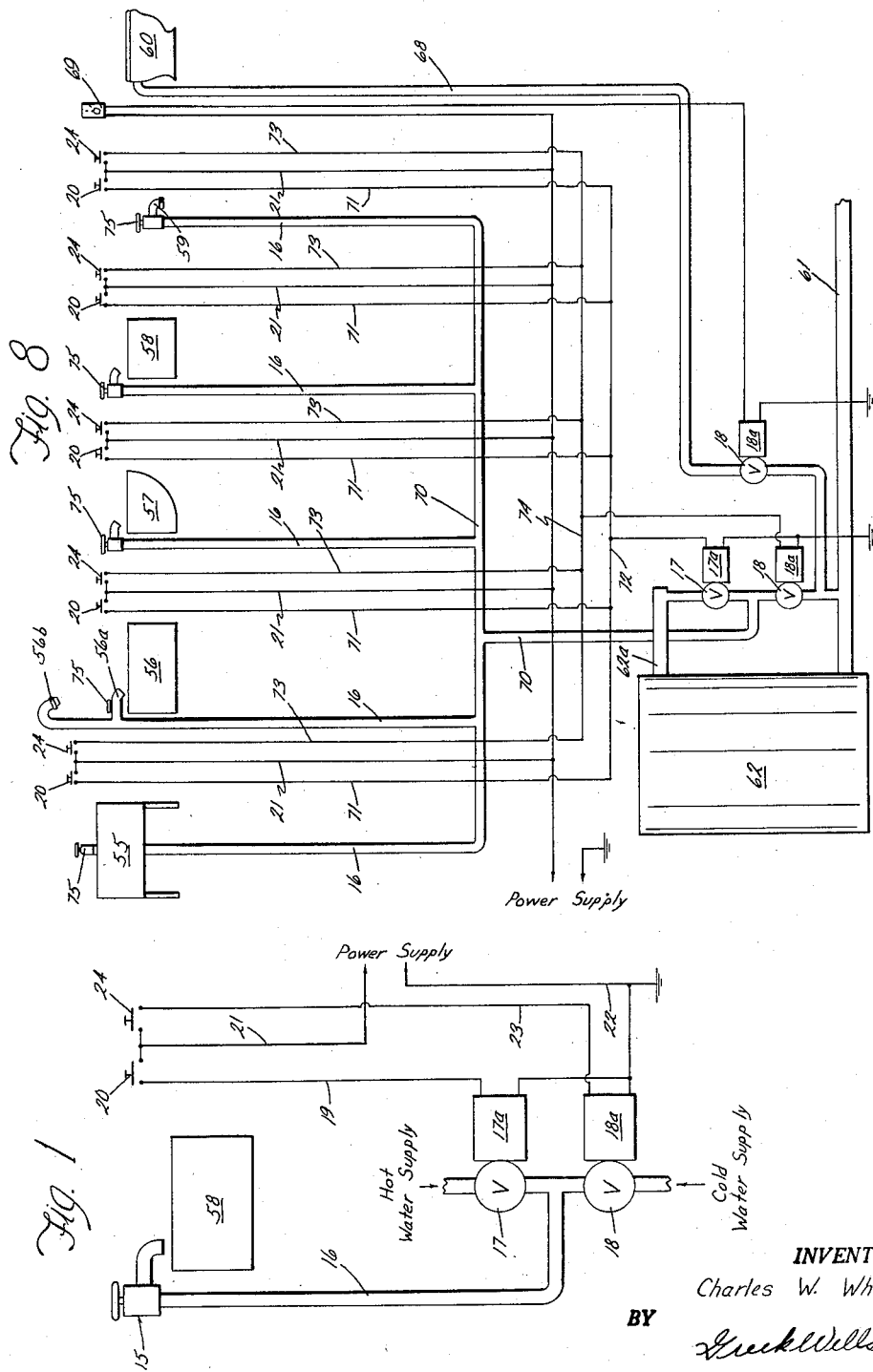

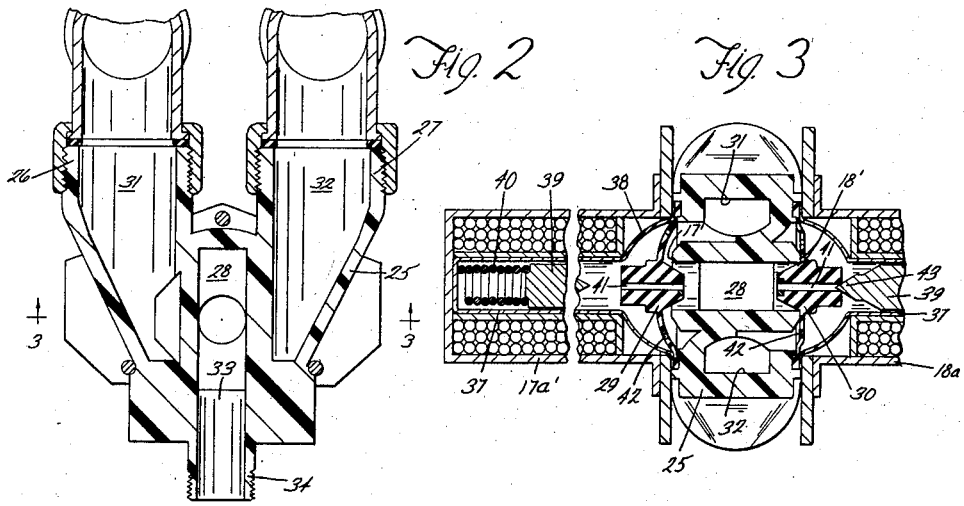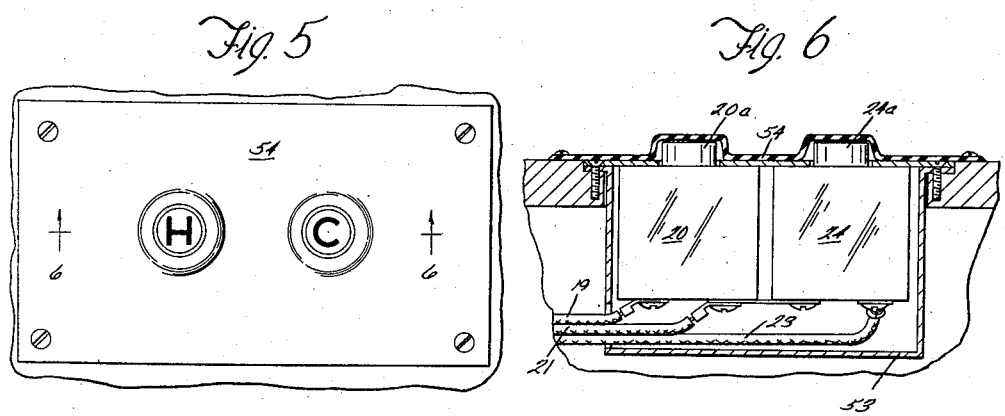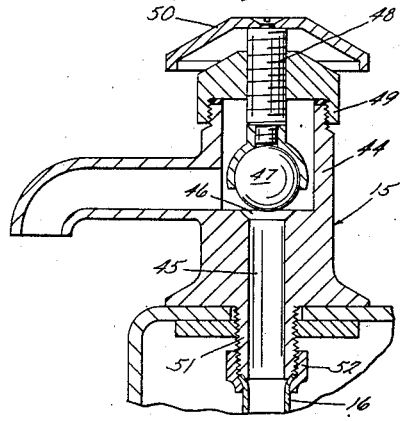

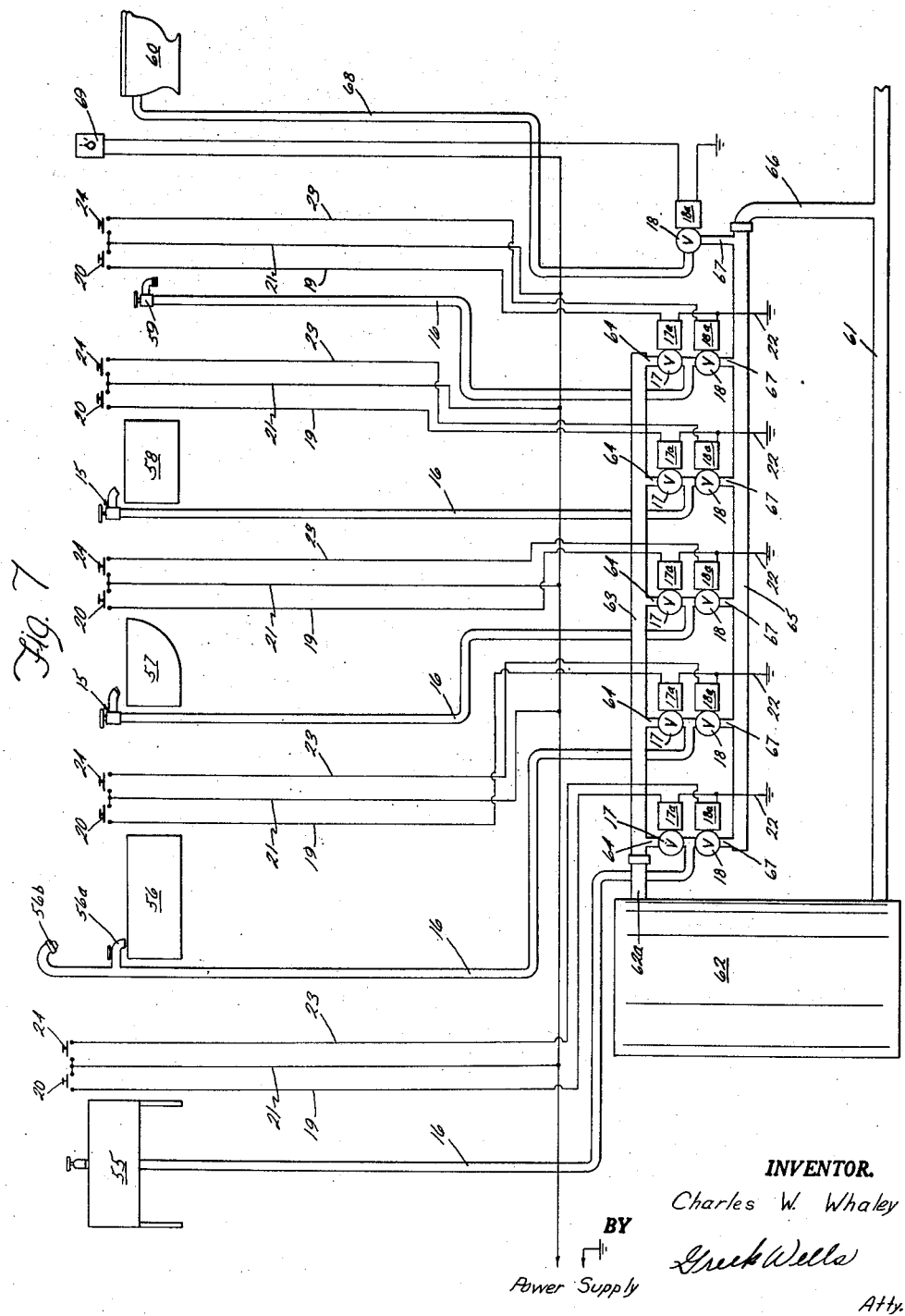

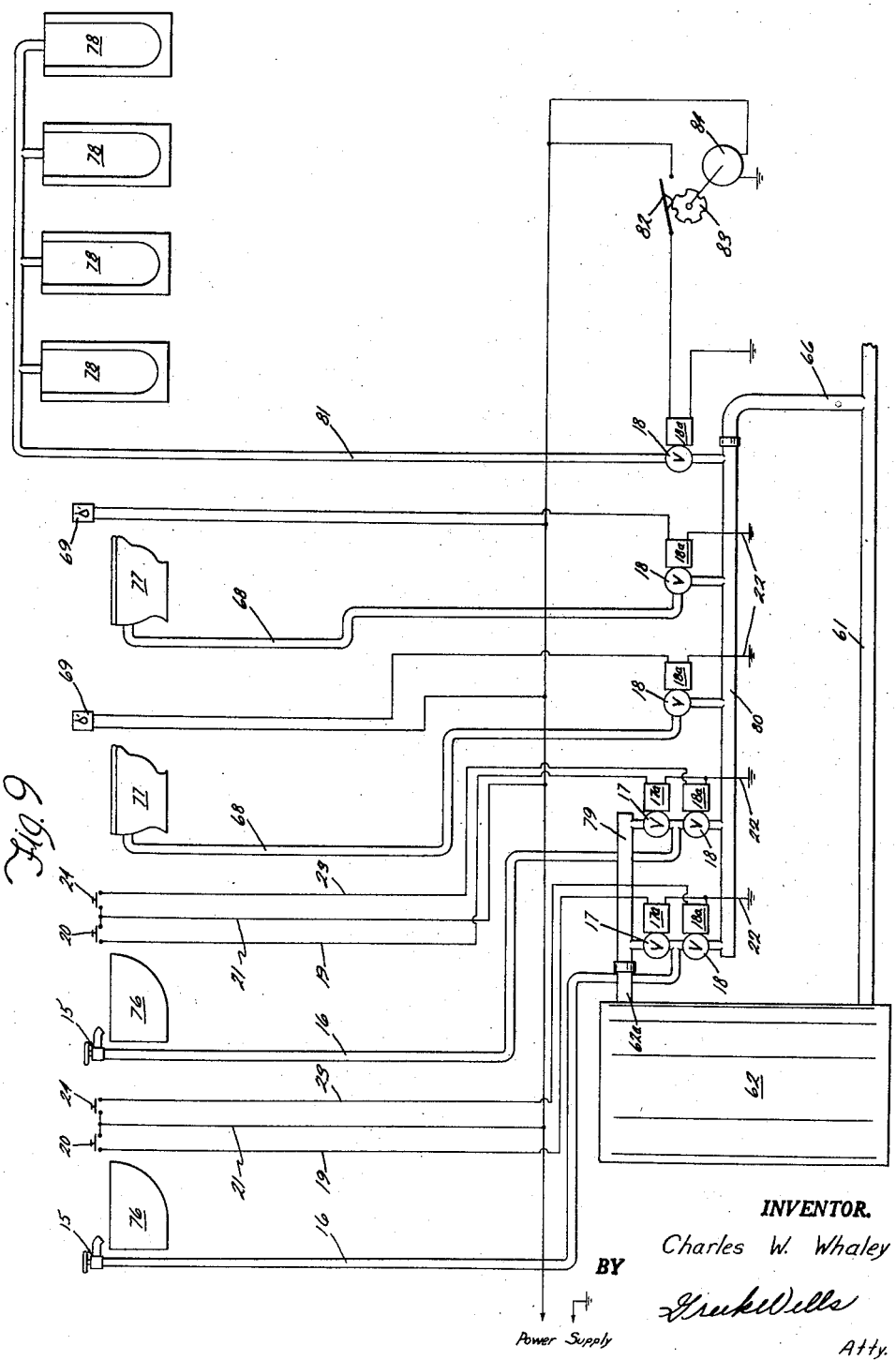

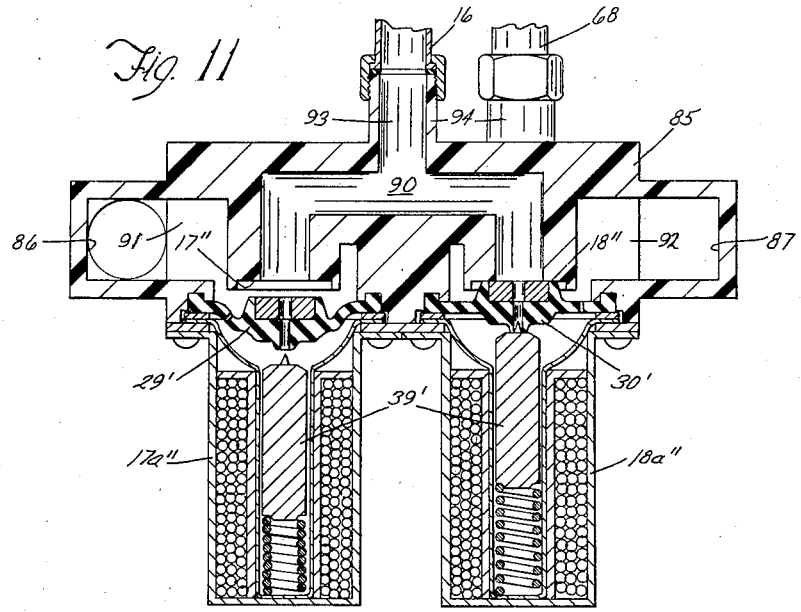
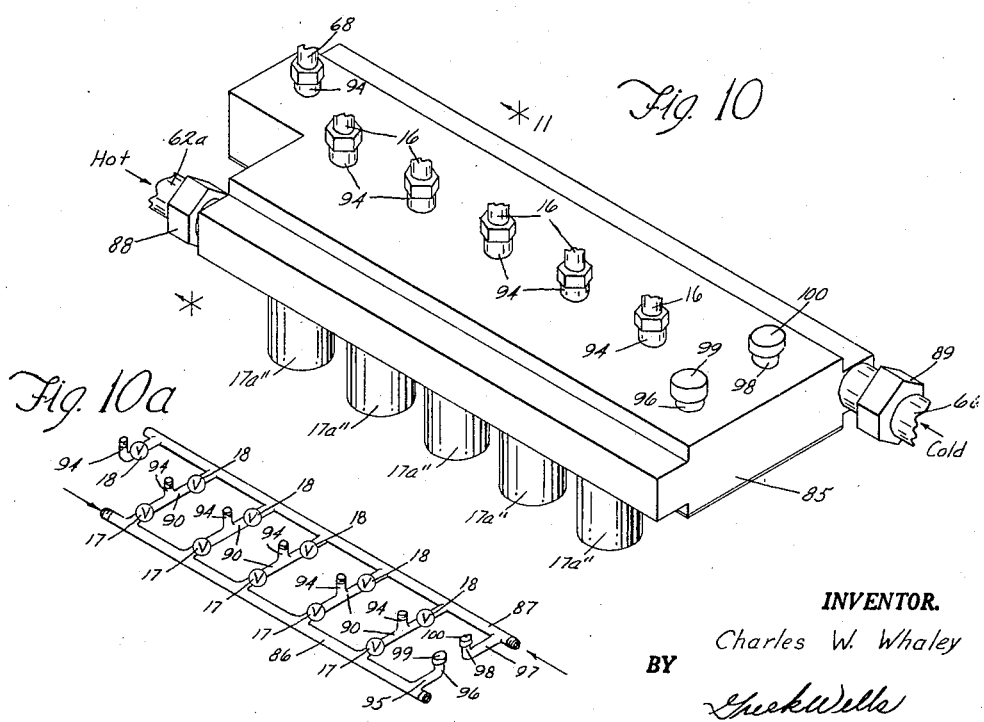

2,908,017

ELECTROMAGNETICALLY CONTROLLED WATER DISTRIBUTION SYSTEM

Charles W. Whaley, Spokane, Wash.

Application April 8, 1957, Serial No. 651,365

1 Claim. (Cl. 4—1)

The present invention relates to improvements in plumbing systems.

It is the principal purpose of this invention to provide hot and cold water supply means for dwellings and commercial buildings operable to provide at suitable locations, hot and cold running water, utilizing only a single water carrying pipe extending from the water supply source to the outlet, and utilizing remotely controlled valve means at the supply source to introduce hot and/or cold water into the carrying pipe by selective operation of control means positioned at the outlet location.

It is a further purpose of the invention to provide such a supply means having safe and simple electrical control means for operation of said valves.

Another purpose of the invention is to provide such a supply system including novel plumbing means for restroom facilities such as toilets, urinals and the like.

My invention comprises essentially a single carrying pipe extending from the desired outlet location, as for example a kitchen sink, to the hot and cold water supply source for the building unit; that is, the hot water tank and cold water main, together with a pair of electromagnetically operated valves connected to the hot and cold water supply sources respectively, and connected to the common carrying pipe, and switch means positioned at the outlet location operable to selectively open and close the two valves to introduce either hot water or cold water, or a mixture of hot and cold water, into the carrying pipe to be transported and delivered at the outlet. As will appear more clearly hereinafter, this basic combination may be repeated for each desired outlet, as for example a bath tub, bathroom wash bowl, etc., to form a complete plumbing system wherein each water outlet is provided with an independent carrying pipe and valves. It is also possible, with certain limitations that will appear later herein, to combine two or more outlets with a single carrying pipe and valves.

The nature and advantages of my invention will appear more clearly from the following description and the accompanying drawings, wherein several forms of the invention are shown. The description and drawings are considered as illustrative only, however, and are not intended to limit the invention except insofar as it is limited by the claim.

In the drawings:

Figure 1 is a diagrammatic view illustrating the basic concept of the invention;

Figure 2 is a sectional view of an electro-magnetically operated valve mechanism which may be used with my invention;

Figure 3 is a sectional view taken on the line 3—3 of Figure 2;

Figure 4 is a sectional view illustrating a simple flow regulating faucet which may be used with my invention;

Figure 5 is an elevation view illustrating a switch panel which may be used with my invention;

Figure 6 is a sectional view taken on the line 6—6 of Figure 5;

Figure 7 is a diagrammatic view illustrating a typical residential plumbing system embodying my invention;

Figure 8 is a diagrammatic view illustrating a modified residential plumbing system embodying my invention;

Figure 9 is a diagrammatic view illustrating a commercial restroom plumbing system embodying my invention;

Figure 10 is a perspective view of a bank of electromagnetically operated valves connected in accordance with my invention;

Figure 10a is a diagrammatic illustration showing the connection of the valves in the bank shown in Figure 10; and Figure 11 is an enlarged cross sectional view taken substantially on the line 11—11 of Figure 10.

Referring now to the drawings, Figure 1 illustrates the manner in which I provide hot and/or cold water at an outlet remote from the water supply means with the use of a single carrying pipe. As shown in Figure 1, I provide at the outlet location a faucet 15 to which is connected a single water carrying pipe 16. The pipe 16 extends from the faucet 15 to the hot and cold water supply source and is connected to the outlet ports of two shut-off valves 17 and 18. The in-take port of the valve 17 is connected with a hot water supply source and the in-take port of the valve 18 is connected with a cold water supply source. With this construction it will readily be seen that if the valve 17 is opened, hot water will flow from the hot water source through the carrying pipe 16 to the faucet 15 where it is discharged. Likewise if the valve 18 is opened, cold water will be introduced into the carrying pipe 16 and discharged from the faucet 15. Thus it is possible with the construction just described to utilize the single carrying pipe 16 to deliver either hot or cold water to the faucet 15. It is also possible by opening both valves 17 and 18 to deliver to the faucet 15 a mixture of hot and cold water. When the valve 17 and 18 are both closed, no water will flow in the pipe 16 and therefore it is unnecessary to use the valve 15 as a water shut-off valve. It may be set to regulate the amount of flow desired and then left in this position.

It is of course, necessary to provide means to open and close the valves 17 and 18 from the outlet location, that is, the location of the faucet 15. To accomplish this the valves 17 and 18 are provided with actuating solenoids 17a and 18a. The valves 17 and 18, as will be explained hereinafter, are constructed to be opened when the solenoids 17a and 18a are energized, and to close by spring action when the solenoids 17a and 18a are de-energized. The solenoid 17a is connected by an electric wire 19 to one contact of a switch 20. The other contact of the switch 20 is connected by a lead 21 to the positive side of an electric power source. The ground side of the power source is connected by a lead 22 to the opposite side of the solenoid 17a. In like manner the solenoid 18a is connected by a line 23 to a switch 24 that is connected to the power source by the lead 21 as shown in Figure 1. The solenoid 18a is also connected to the ground lead 22. The switches 20 and 24 are positioned adjacent the faucet 15. When cold water is desired at the faucet 15, the switch 24 may be closed to actuate the solenoid 18a and open the valve 18, thus permitting cold water to flow through the carrying pipe 16 to the faucet 15. When hot water is desired, the switch 20 is closed, actuating the solenoid 17a to open the valve 17 and introduce hot water to the pipe 16. If a mixture of hot and cold water is desired, both switches 20 and 24 may be closed.

It should be apparent from the foregoing that the combination of elements just described provides hot and/ or cold running water at any desired outlet location with the use of the two solenoid operated valves 17 and 18 and the single pipe 16, thus obviating the necessity of two independent water pipes extending from the water supply source to the outlet location. Also with my invention it is not necessary to have two water controlling valves at the outlet location as is the case with standard plumbing systems. The single faucet 15 that I utilize need not be a water sealing faucet but merely a flow regulator, since the valves 17 and 18 are utilized as the shut off valves for the hot and cold water. Thus in place of the two expensive shut off valves formerly necessary, I substitute a single inexpensive flow regulating faucet 15.

In Figures 2 and 3 I have shown a commercial solenoid valve mechanism which may be used with my single pipe system. This valve is actually a double valve mechanism which acts as the valve 17 and the valve 18. The particular mechanism shown in Figures 2 and 3 is manufactured by the Fulton Sylphon Co. for use in automatic washing machines. It comprises a molded plastic body member 25 which has two pipe coupling nipples 26 and 27 thereon adapted to be coupled to hot and cold water pipes. At the center of the body 25, a transverse passage 28 is provided which has a valve seat 17' at one end and a second valve seat 18' at the other end. Rubber diaphragms 29 and 30 are provided over the valve seats 17' and 18' and are adapted to close against the seats to seal both ends of the passage 28. A water in-take passage 31 extends from the coupling nipple 26 into the body 25 and communicates with the passage 28 over the valve seat 17'. A second in-take passage 32 extends from the coupling nipple 27 into the body 25 and communicates with the passage 28 over the seat 18'. An outlet passage 33 extends from the center of the passage 28 to an outlet nipple 34. With this construction water may flow from the passage 31 over the seat 17' and into the passage 28 when the diaphragm 29 is lifted away from the seat 17', but cannot flow into the passage 28 when the diaghram 29 is sealed against the seat 17. In like manner water can flow through the passage 32 and into the passage 28 over the seat 18' when the diaphragm 30 is lifted away from the seat 18'.

In order to manipulate the diaphragms 29 and 30, solenoids 17a' and 18a' are provided. Each solenoid 17a' and 18a' includes a closed end tube 37 which has a belled portion 38 thereon that seats against the outer surface of the diaphragm 29 or 30. A movable core 30 is provided in the tube 37 to move toward and away from the diaphragm 29 or 30. A spring 40 is interposed in the tube 37 between the core 39 and the closed end of the tube to urge the core 39 against the diaphragm 29 or 30. Each of the diaphragms 29 and 30 has a central aperture 41 therein which opens the passage 28 to the interior of the tube 37. The diaphragms 29 and 30 also have pressure equalizing ports 42 therein spaced outwardly from the seat engaging portions of the diaphragms 29 and 30. The cores 39 have pointed ends 43 which extend into and close the apertures 41 when the cores 39 are spring pressed against the diaphragms 29 and 30. With this construction, each diaphragm 29 or 30 is normally spring pressed against its seat 17' or 18' to seal the ends of the passage 28, the cores 39 entering into and closing the apertures 41. When the parts are in this position, no water can flow from the passages 31 and 32 into the passage 28. The solenoids 17a' and 18a', however, are constructed to retract the cores 39 by electro-magnetic force when these solenoids are energized. When a core 39 is retracted from the diaphragm 29 or 30 that it formerly engaged, this opens the aperture 41 and allows water to flow from the passage 31 or 32 through the equalizing ports and through the aperture 41 into the passage 28, thus equalizing the pressure between the passage 28 and the in-take passage 31 or 32 and allowing the diaphragm 29 or 30 to move away from its seat 17' or 18' and open that end of the passage 28 to water flow. When the electro-magnetic force is removed from the core 39 by de-energizing the solenoid 17a' or 18a', the pressure of the spring 40 forces the core 39, closing the aperture 41 and forcing the diaphragm 29 or 30 against its seat 17' or 18' to seal off the water flow.

When the device just described is used with my invention to take the place of the valve 17 and 18 described in connection with the Figure 1, the hot and cold water supplies are connected to the nipples 26 and 27 respectively and the common carrying pipe 16 is connected to the outlet nipple 34. The solenoids 17a' and 18a' are connected to the power supply through the switches 20 and 24 as described in connection with Figure 1. Thus it may be seen that the basic combination of my invention may be readily assembled with existing standard plumbing elements.

In Figure 4 I have shown a simple and economical flow regulating faucet construction for the faucet 15. As illustrated, this construction comprises a body member 44 having a passage 45 therein which has a valve seat 46 at the upper end thereof. A ball 47 is suspended at the end of a threaded shaft 48 above the seat 46. The shaft 48 is threaded in a cap 49 that fits over the top of the faucet body 44. A handle 50 is fixed at the top of the shaft 48 by means of which the shaft 48 may be rotated to move the ball 47 toward and away from the seat 46. The passage 45 in the body 44 extends through a connecting nipple 51 to which the carrying pipe 16 may be attached. As shown in Figure 4, the carrying pipe 16 may be of copper tubing and connected to the nipple 51 with a simple connecting nut 52 such as is commonly used with copper tubing. While the faucet 15 is not a water sealing faucet, it does serve to regulate the flow of water through the pipe 16 and this is all that is necessary with my invention, since the valves 17 and 18 perform the water sealing operation at the water supply source.

The switches 20 and 24, used with my invention, may be of any suitable type. I have found, however, that the most convenient type of switch is a push button switch that can be pushed once to make, and pushed again to break. Switches of this type are common in the electrical field. For example, the Minneapolis Honeywell Company currently makes such a switch for lighting circuits and distributes it under the name of "Tap-Lite." In Figures 5 and 6, I have shown two switches 20 and 24 of this type. The switches 20 and 24 are mounted flush with a wall in a switch box 53 and the switches have push buttons 20a and 24a which extend out from the wall and which may be depressed to actuate the switch 20 and 24. In order to insure absolute protection against shocking when using the switches 20 and 24, I provide a soft rubber cover plate 54 which may be attached to the wall to cover the switch box 53 and the switches 20 and 24. The cover plate 54 has suitable indicia thereon to indicate the position of the buttons 20a and 24a therebeneath so that the operator may press the cover plate 54 in the proper position to actuate either of the switches 20 or 24.

Having thus described the basic combination of elements which comprise my invention, and having indicated suitable existing elements that may be used in combination, I shall now illustrate several different methods of using my invention in plumbing systems.

In Figure 7 I have shown a typical residential plumbing system constructed in accordance with my invention. In an ordinary residence plumbing must be provided for laundry trays 55, a bath tub 56, a bath room basin 57, a kitchen sink 58, one or more outdoor faucets 59 and a toilet 60. The water supply source for the residence comprises a cold water main 61 leading into the residence; and a hot water tank 62 connected to the cold water main as illustrated in Figure 7. In supplying hot and cold water from the tank 62 and main 61 to the several water outlets mentioned above, I connect to the hot water outlet 62a of the tank 62 a hot water distributing pipe 63 which has a number of transverse lead off pipes 64 connected therewith. A second distributing pipe 65 is connected to a cold water outlet pipe 66 extending from the main 61. The pipe 65 has a number of lead off pipes 67 extending therefrom. For the system shown in Figure 7, there are five lead off pipes 64 connected to the hot water distributing pipe 63 and there are six lead off pipes 67 connected to the distribution pipe 65. To each of the lead off pipes 64 a hot water control valve 17 is connected. To each of the lead off pipes 67 a cold water control valve 18 is connected. Each of the valves 17 and 18 has an actuating solenoid 17a or 18a connected thereto as hereinbefore described. As shown in Figure 7, five of the cold water valves 18 are paired with the five hot water valves 17 and the outlet ports of each pair are connected to a common carrying pipe 16, there being five of the pipes 16, one extending to each of the water outlet locations at the laundry trays 55, bath tub 56, basin 57, sink 58 and outside faucets 59. At each of these locations switches 20 and 24 are provided and are connected to the solenoids 17a and 18a of the valves 17 and 18 as hereinbefore described. With this construction hot water or cold water, or a mixture of both, may be obtained at each of the outlets by selective manipulation of the switches 20 and 24. For example, if hot water is desired at the kitchen sink 58, the switch 20 adjacent the kitchen sink may be depressed to cause current to flow from the power supply through the switch 20 and to the solenoid 17a of the hot water valve 17 that is connected to the pipe 16 leading to the kitchen sink. When this valve 17 is opened, hot water can flow from the tank 62 through the distributing pipe 63 and through the valve 17 into the carrying pipe 16 and hence to the kitchen sink. When it is desired to stop the flow, the switch 20 may be depressed again to open it, de-energizing the solenoid 17a, and close the valve 17. Operation of the switches 20 and 24 at each of the other outlet location gives a similar result.

In Figure 7, I have shown a bath tub 56, having both a tub filling faucet 56a and a shower head 56b. Both the faucet 56a and the shower head 56b are connected to the carrying pipe 16 which supplies water to the bath tub. The shower head 56b is constructed so that by turning it, it may be closed off, thus permitting the tub to be filled without discharging water from the shower head. A shut off valve must also be provided at the tub filling faucet 56a to prevent flow therefrom when it is desired to use the shower.

The toilet 60 is connected to the water supply source by a pipe 68 which connects to the outlet port of the 6th cold water control valve 18. Since no hot water is needed for the toilet 60, no hot water supply valve is provided. The valve 18, which is connected to the pipe 68, has an actuating solenoid 18a thereon which is connected to the power source through a timing switch 69. The switch 69 is of the type which when closed, will remain closed for a predetermined length of time and then open automatically. By adjustment of the closed time of the switch 69, the proper amount of water to flush the toilet 60 may be obtained. When the switch 69 is closed to energize the solenoid 18a connected thereto and open the toilet control valve 18, water will flow from the cold water distribution pipe 65 through the pipe 68 and to the toilet 60 to perform the flushing operation.

While I have shown the water distribution system in Figure 7 as including distribution pipes 63 and 65 and a plurality of separate solenoid valves for each of the water outlets, I do not intend to limit my invention to such a connection. In Figure 8, I have shown another and more economical method of supplying water to the several outlets 55–59. This system utilizes only one hot water control valve 17 and one cold water control valve 18, the hot water control valve being connected to the outlet 62a of the tank 62 and the cold water control valve being connected to the cold water pipe 66 leading from the main 61. In this system each of the pipes 16 leading from the several water outlets is connected to a common pipe 70 that is connected to the valves 17 and 18. In the system shown in Figure 8, each of the water outlets is provided with a switch 20 and a switch 24 to control the valves 17 and 18. The several switches 20 and 24 each have a contact connected by a line 21 to the power supply just as shown in Figure 1. The opposite contact of each switch 20, however, is connected by a line 71 to a common line 72 that connects to the solenoid 17a of the hot water valve 17. The opposite contact of the switches 24 is connected by a line 73 to a common line 74 that connects to the solenoid 18a of the valve 18. Thus depression of any of the switches 20 operates to energize the solenoid 17a and open the valve 17 to permit hot water to flow from the tank 62 into the carrying pipe 70. Depression of any of the switches 24 energizes the solenoid 18a and opens the valve 18 to permit cold water to flow from the water main 61 into the carrying pipe 17. Since the carrying pipe 70 joins with the carrying pipe 16 to each of the outlets, water introduced into the pipe 70 will flow through all of the pipes 16 to all of the outlets 55 and 59. It is therefore necessary to provide at each outlet a water sealing faucet 75 so that the outlets may be closed when not in use. With the system shown in Figure 8, water is obtained at any of the outlets, as for example, the kitchen sink 58, by manipulating the adjacent switches 20 and 24 to cause the desired water to flow into the pipes 70 and 16 and then by opening the faucet 75 at the outlet desired to be used. Water is shut off by first closing the faucet 75 and then manipulating the switches 20 and 24.

This system shown in Figure 8 is much more economical in construction than the system shown in Figure 7, since only one hot water control valve 17 and only one cold water control valve 18 are necessary for all of the outlets 55–59. The system does have its drawbacks, however, in that if hot water is being withdrawn from any one of the outlets 55–59, it is impossible at the same time to obtain cold water from another of these outlets, and conversely, if cold water is being withdrawn from any of the outlets, hot water may not be simultaneously withdrawn from another.

It will be understood that the combinations shown in Figures 7 and 8 are not the only combinations possible with my invention and that certain features of each of the two systems may be combined as desired. For example, separate valves 17 and 18 may be provided for each of the outlets such as the laundry trays 55, the kitchen sink 58 and the outside faucets 59, while the bath tub 56 and the bowl 57 may be served by a single set of valves 17 and 18. In another system the laundry trays 55 and the kitchen sink 58 may be connected to a single set of valves 17 and 18. The particular combinations may be adjusted to suit the needs of the system being designed. It will always be necessary, however, to provide a separate cold water control valve 18 for the toilet 60, since this device is operated in a different manner from the other water outlets as hereinbefore described.

In Figure 9 I have shown a plumbing system adapted for commercial restroom facilities, which includes wash bowls 76, toilets 77 and urinals 78. The water supply source for this system includes a cold water supply main 61 and a hot water tank 62. To provide hot and cold running water for the wash bowls 76 two carrying pipes 16 are provided, extending from the bowls 76 to the water supply source, that is, the main 61 and tank 62. A hot water control valve 17, and a cold water control valve 18, are provided for each of the carrying pipes 16, as shown in Figure 9. The hot water control valves 17 are connected to a distribution pipe 79 connected to the outlet 62a of the hot water tank 62. The cold water supply valves 18 are connected to a distribution pipe 80 which is connected to the cold water outlet pipe 66 extending from the main 61. Switches 20 and 24 are provided for each of the wash bowls 76 and are connected to the solenoids 17a and 18a of the valves 17 and 18 in the same manner as shown in Figure 1. With this construction hot or/and cold water may be obtained at each wash bowl 76 by proper manipulation of the switches 20 and 24. The several toilets 77 are connected in the same manner as shown in Figure 7 by the pipes 68 which extend to the cold water supply valves 18 provided for each of the toilets 77. These valves 18 are connected to the distribution pipe 80. The solenoids 18a of the toilet control valves 18 are connected through the timing switches 69 to the power supply source.

To provide flushing water for the several urinals 78, I connect each urinal 78 to a single cold water carrying pipe 81 which extends from the urinal 78 to a cold water control valve 18 connected to the cold water distribution pipe 80. When this valve 18 is opened, cold water will flow through the carrying pipe 81 to each of the urinals 78 to perform the flushing operation. In the operation of urinals in commercial restrooms, it is common practice to provide automatic flushing means to flush all of the urinals simultaneously at timed intervals. To accomplish this, I connect the solenoid 18a of the urinal control valve 18 through a cam operated switch 82. The switch 82 is actuated by a cam 83 driven by a clock motor 84. The cam 83 is driven continuously and is shaped to close the switch 82 for a short period of time at spaced intervals. By proper shaping of the cam 83, the switch 82 may be made to close as often as desired for a particular circumstance present. For example, in an office building where restrooms are used primarily during the business hours, the cam 83 may be connected in such a way as to complete one revolution in each 24 hour period and may have switch closing notches thereon spaced to close the switch 82 at 15 minute intervals between the hours of 8:00 a.m. and 6:00 p.m. and other notches spaced to close the switch 82 at one hour intervals through the remainder of the 24 hour period.

In the plumbing system shown in Figures 7, 8 and 9, the valves 17 and 18 may take the form of commercial solenoid valve units as shown in Figures 2 and 3 of the drawings, and may be connected to distribution pipes 63 and 65 or 78 and 80, as shown in Figures 7 and 9. It is preferable to provide a more compact and more easily installed distribution system such as I have shown in Figures 10 and 11. As shown in Figure 10, a unitary valve bank 85 may be provided. This valve bank 85 is a single mounted plastic unit which includes hot and cold water distributing passages 86 and 87 extending along each side thereof and having connection means as indicated at 88 and 89 for connection to the hot water outlet pipe 62a and the cold water outlet pipe 66. At spaced intervals throughout the body of the unit 85, transverse passages 90 may be provided as shown in Figure 11. The passages 90 communicate at each end with valve seats 17" and 18". Water inlet passages 91 and 92 are provided between the passages 86 and 87 and the seats 17" and 18". Diaphragms 29' and 30' are mounted in the body 85 to close against the seats 17" and 18" to seal the ends of the passages 90 from the inlet passages 91 and 92. The diaphragms 29' and 30' are manipulated by solenoids 17a" and 18a" which include movable cores 39' in the same manner as described in connection with Figures 2 and 3. Each passage 90 has a water outlet passage 93 connected therewith and extending through a connecting nipple 94 provided on the body 85. With this unitary valve bank 85 each of the passages 90 with its valve seats 17" and 18", diaphragms 29' and 30' and solenoid 17a" and 18a", takes the place of one set of valves 17 and 18, as shown in Figures 7, 8 and 9. Banks 85 may be made up with as many passages 90 and associated parts as are needed for the particular plumbing system to be provided. At one end of the body 85 a single solenoid valve, including a single valve seat 18", together with diaphragm 30' and inlet passage 92 and an outlet passage 93 and a diaphragm manipulating solenoid 18a" is provided. This single valve serves as the toilet control valve for the system. Where two toilets are to be provided, two of these single valves may be constructed in the bank 85. At the opposite end of the valve bank 85, a passage 95 is provided extending from the distribution passage 86 to a connection nipple 96 on the body 85. A second passage 97 is provided extending from the distribution passage 87 to a connection nipple 98 provided on the body 85. Sealing caps 99 and 100 are threaded onto the nipples 96 and 98 to close the passages 95 and 97. These passages have no valve mechanisms in them and are provided for the purpose of connecting an automatic washer in the plumbing system. The hot and cold water supply hoses for the washer may be connected to the nipples 96 and 98 to provide water supply means for the washer.

It will be readily seen from the foregoing that my invention is susceptible to many and varied combinations for water distribution systems, and in each case provides a system wherein each water outlet needs but a single carrying pipe 16 to supply it with both hot and cold water. My invention, when applied to such facilities as toilets and urinals, provides adequate flushing means without the use of expensive flush tanks and associated mechanisms. In every case my invention does away with a large portion of the expensive plumbing features and supplies presently necessary, with standard systems. By locating the water supply source for a system in the proper place to provide for the shortest runs from source to outlet, as for example, below the bathroom in a residence, and utilizing copper tubing as carrying pipe, a plumbing system constructed in accordance with my invention may be installed at a fraction of the present plumbing cost.

It is believed that the nature and advantages of my invention appear clearly from the foregoing description.

Having thus described my invention, I claim:

In a water distribution system including a cold water supply main, a hot water tank connected to said cold water supply means, and a plurality of water outlets such as sinks, bath tubs, basins, laundry tubs and the like remote from said water main and said tank, means for supplying hot and cold water to said outlets comprising a single water carrying pipe extending from the tank and the water main to each of said outlets, a hot water shut off valve connected to said hot water tank and a cold water shut off valve connected to the cold water main, each of said carrying pipes being connected to said hot and cold water valves whereby to receive hot water when the hot water valve is opened and whereby to receive cold water when the cold water valve is opened, shut off means at the discharge ends of said carrying pipes to prevent flow therefrom, electro-magnetic actuating means connected to each of said valves and operable to open said valves upon energization of said electro-magnetic actuating means, means for closing each of said valves upon de-energization of said actuating means, a power supply source, current conductors connected to each of said electro-magnetic actuating means and to said power supply source, and switch means in certain of said conductors operable to break the circuits between said actuating means and said power source whereby to control said valves.

References Cited in the file of this patent

UNITED STATES PATENTS

| | | |
|---|---|---|
| 2,402,280 | Green | June 18, 1946 |
| 2,438,207 | Derby | Mar. 23, 1948 |
| 2,507,966 | Filliung | May 16, 1950 |
| 2,508,074 | Miller et al. | May 16, 1950 |
| 2,590,147 | Bellamy | Mar. 25, 1952 |
| 2,688,141 | Filliung | Sept. 7, 1954 |
| 2,717,396 | Chiles | Sept. 13, 1955 |
| 2,747,801 | Frey | May 29, 1956 |
| 2,786,210 | Fraser | Mar. 26, 1957 |

FOREIGN PATENTS

| | | |
|---|---|---|
| 504,185 | Great Britain | Apr. 17, 1939 |